United States Patent [19]

Blomberg

[11] Patent Number: 5,001,904
[45] Date of Patent: Mar. 26, 1991

[54] FAN COOLED ABSORPTION REFRIGERATING APPARATUS

[75] Inventor: Peter E. Blomberg, Stockholm, Sweden

[73] Assignee: Aktiebolaget Electrolux, Stockholm, Sweden

[21] Appl. No.: 419,202

[22] Filed: Oct. 10, 1989

[30] Foreign Application Priority Data

Oct. 28, 1988 [SE] Sweden .................................. 8803880

[51] Int. Cl.⁵ .............................................. F25B 27/00
[52] U.S. Cl. ..................................... 62/238.3; 62/476; 60/527
[58] Field of Search ...................... 62/238.3, 476, 332, 62/335, 148; 60/527

[56] References Cited

U.S. PATENT DOCUMENTS

| 2,664,000 | 12/1953 | Smith | 62/238.3 X |
| 3,473,346 | 10/1969 | Reistad | 62/476 |
| 4,275,561 | 6/1981 | Wang | 60/527 |
| 4,691,528 | 9/1987 | Tongu | 62/476 X |
| 4,785,627 | 11/1988 | Al-Jaroudi | 60/527 |
| 4,791,790 | 12/1988 | Tongu | 62/476 |

Primary Examiner—Lloyd L. King
Attorney, Agent, or Firm—Pearne, Gordon, McCoy & Granger

[57] ABSTRACT

In an absorption refrigerating apparatus (18) operated by a fuel in gas or liquid state the condenser (50) is cooled by an air flow generated by a fan (82). The fan is driven by a heat operated motor consisting of an endless wire loop formed (84) of a shape memory alloy which gets its operating heat from the exhaust gas from the fuel.

3 Claims, 1 Drawing Sheet

FAN COOLED ABSORPTION REFRIGERATING APPARATUS

BACKGROUND OF THE INVENTION

The invention relates to an absorption refrigerating apparatus which is operated by a fuel in gas or liquid state and the condenser of which being cooled by an air flow generated by a fan.

DESCRIPTION OF THE PRIOR ART

An absorption refrigerating apparatus is known through e.g. GB patent No. 402,298, where among other things the condenser of the apparatus is cooled by a fan which increases the refrigerating power of the apparatus. The fan is operated by electricity which is, however, not always available.

SUMMARY OF THE INVENTION

The object of present invention is to bring about such an absorption refrigerating apparatus introductorily set forth, where the fan can be operated independently of electricity by the heat from the exhaust gas from the fuel.

This object is achieved by the absorption refrigerating apparatus according to the present invention whereby the fan is driven by a heat operated motor consisting preferably of an endless wire loop formed of a shape memory alloy, the wire loop is wrapped around and drives a first wheel and a second wheel, the wire loop getting its operating heat from the exhaust gas of the fuel.

Such a motor is known per se through e.g. U.S. Pat. No. 4,275,561.

BRIEF DESCRIPTION OF THE DRAWINGS

One embodiment of an absorption refrigerating apparatus according to the present invention will be described below in connection with the attached drawing, in which FIG. 1 schematically shows an absorption refrigerating apparatus with a fan cooling the condenser of the apparatus and FIG. 2 in a sectional view take along line II—II of FIG. 1 which shows the driving of the fan by an endless wire loop of a shape memory alloy.

DETAILED DESCRIPTION OF THE PREFERRED EMBODIMENT

Figure 1:
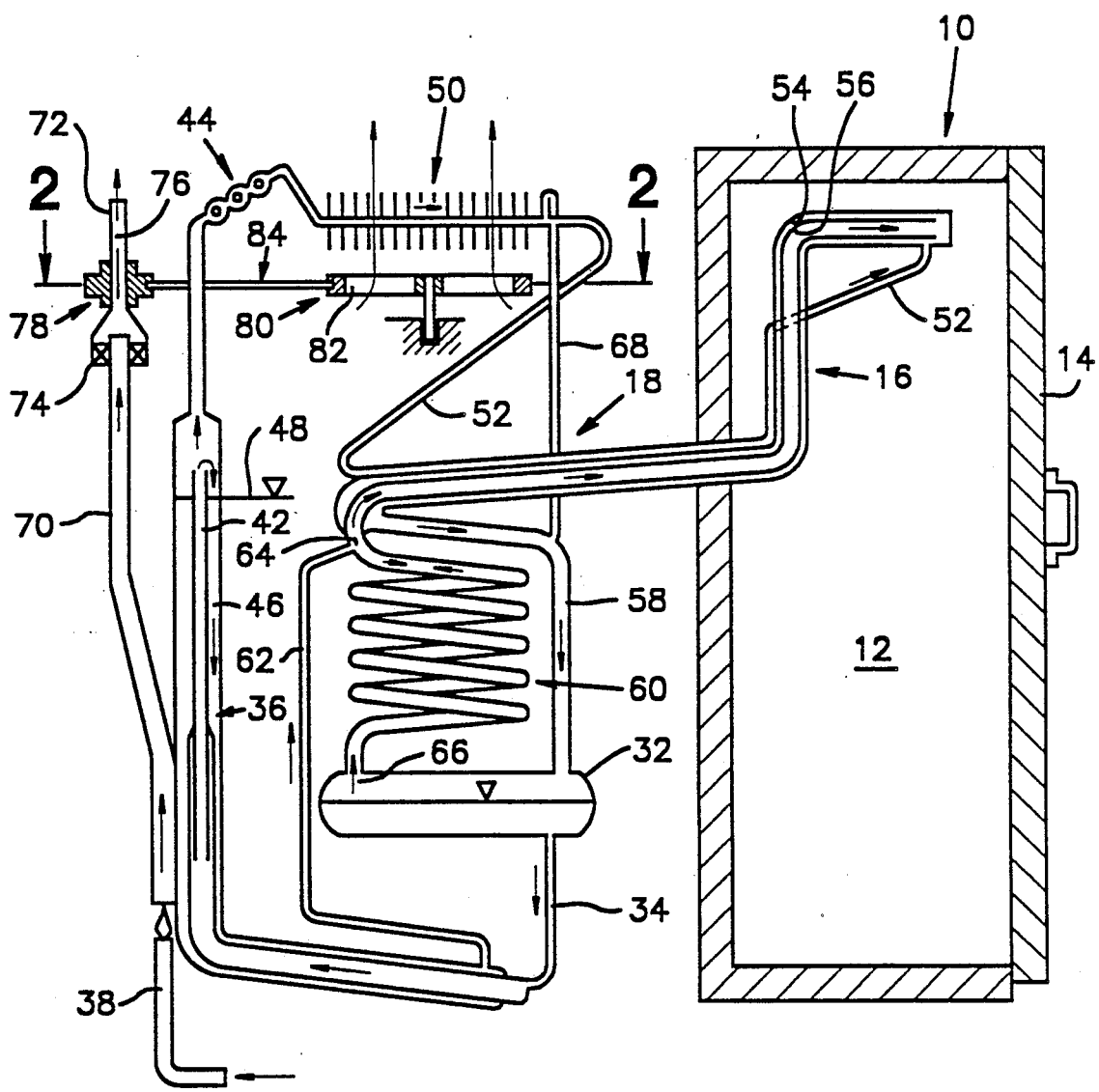
Figure 2:
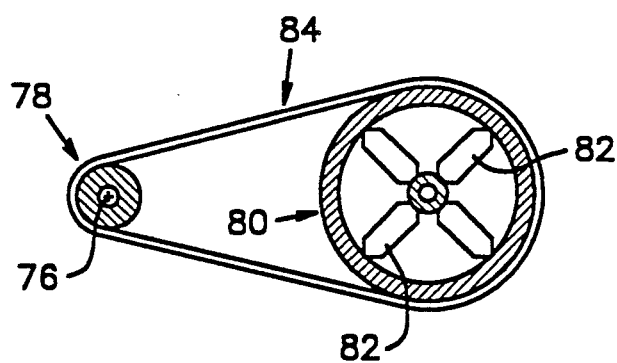

Numeral 10 designates a refrigerator cabinet containing a refrigerated chamber 12 which is closed by a door 14. The chamber 12 is cooled by the evaporator 16 of an absorption refrigerating apparatus 18 arranged behind the cabinet 10.

The refrigerating apparatus 18, which is of a known kind, e.g. according to FIG. 3 of U.S. Pat. No. 4,691,528, shows an absorber vessel 32 containing an absorption liquid, such as water, in which a refrigerant, such as ammonia, is dissolved. This solution, which is relatively rich in refrigerant, is called a rich solution. The rich solution exits from the absorber vessel 32 through a conduit 34 and enters a boiler 36 in which the rich solution is supplied with heat from a gas burner 38. Refrigerant vapor boils off from the rich solution which thereby becomes a so-called weak solution. The mixture of regfrigerant vapor and weak solution is expelled through a pump pipe 42, the refrigerant vapor continuing to a separator 44 which separates out absorption liquid accompanying the refrigerant vapor and the weak solution being collected in an outer pipe 46 of the boiler 36 to a certain level 48.

The refrigerant vapor flows from the separator 44 into a condenser 50, where heat is transferred from the vapor to the surrounding air so that the vapor condenses. The refrigerant condensate leaves the condenser through a conduit 52 and enters the evaporator 16, where the condensate meets a flow of an inert gas, such as hydrogen gas, and is vaporized in an outer pipe 54 in the inert gas during absorption of heat from the chamber 12. The inert gas is supplied to the evaporator 16 through an inner pipe 56 which is located within the outer pipe 54 and the mixture of inert gas and vaporized refrigerant exits from the evaporator 16 through the pipe 54 and continues via a pipe 58 to the absorber vessel 32.

From the absorber vessel 32, the mixture of refrigerant vapor and inert gas is elevated through an absorber 60 and meets the weak solution, which, driven by the level 48, comes from the pipe 46 via a conduit 62 into the upper part of the absorber 60 at 64. While flowing downwards through the absorber 60, the weak solution absorbs refrigerant vapor flowing upwards during rejecting of heat to the surrounding air, the weak solution thereby becoming a rich solution again before it flows down into the absorber vessel 32 at 66. The elevating inert gas continues from the absorber 60 to the pipe 56 and enters into the evaporator 16 and permits the refrigerant condensate to vaporize in it.

In order to prevent refrigerant vapor, which possibly does not condensate in the condenser, from collecting in the condenser and blocking the outflow of refrigerant condensate from the condenser, a vent conduit 68 is arranged between the outlet of the condenser 50 and the conduit 58, which conduit 68 leads gaseous medium to the absorber vessel 32.

The burner 38 operates the boiler 36 via a pipe 70, through which the hot exhaust gas from the burner passes. The pipe 70 is extended by a pipe 72 which is rotatably journalled on the pipe 70 around an axis 76 by means of a bearing 74. A wheel 78 is fastened to the pipe 72. Another wheel 80 is journalled rotatably below the condenser 50. The wheel 80 is provided with fan blades 82 inside its circumference. The wheels 78 and 80 are connected by an endless wire loop 84 of a shape memory alloy, e.g. of nickel and titanium, which is such that the wire loop 84 at a certain higher temperature strives to straighten out. Through heat transfer from the exhaust gas via the pipe 72 and the wheel 78, the part of the wire loop 84, which is in contact with the wheel 78, reaches the higher temperature. Other parts of the wire loop 84 are cooled by the surrounding air to a lower temperature which is lower than said higher temperature.

By this the wire loop 84 can therefore cause the wheels 78 and 80 to rotate. Such a motor is described in e.g. the previously cited U.S. Pat. No. 4,275,561.

The wheel 80 brings the fan blades 82 with it which causes a forced air circulation past the condenser 50, the cooling of which thereby becoming improved resulting in an increase of the refrigerating power of the absorption refrigerating apparatus.

I claim:

1. An absorption refrigerating apparatus (18) which is operated by a fuel in either a gas or a liquid state, said refrigerating apparatus comprising a condenser (50) which is cooled by an air flow generated by a fan, said fan being driven by a heat operated motor comprising an endless wire loop (84) formed of a shape memory alloy, said endless wire loop (84) being wrapped around, in driving engagement, a first wheel (78) and a second wheel (80), one of said wheels (78) or (80) being operatively connected to said fan, said endless wire loop (84) deriving its operating heat from the exhaust gas of said fuel.

2. An absorption refrigerating apparatus according to claim 1, wherein the operating heat from the exhaust gas of said fuel passes through said first wheel thereby driving said fan.

3. An absorption refrigerating apparatus according to claim 1 or 2, wherein said fan comprises a plurality of fan blades (82) arranged inside the circumference of said second wheel (80).

* * * * *